United States Patent

Izawa

[11] 3,980,921
[45] Sept. 14, 1976

[54] ILLUMINATING DEVICE FOR A MICROSCOPE

[75] Inventor: Masao Izawa, Tokyo, Japan

[73] Assignee: Olympus Optical Co., Ltd., Tokyo, Japan

[22] Filed: Jan. 21, 1975

[21] Appl. No.: 542,866

Related U.S. Application Data

[63] Continuation of Ser. No. 381,384, July 23, 1973, abandoned.

[30] Foreign Application Priority Data

July 25, 1972 Japan.............................. 47-87684

[52] U.S. Cl............................ 315/206; 315/DIG. 4; 315/DIG. 5; 315/71; 315/276; 315/283
[51] Int. Cl.²......................................... H03F 37/00
[58] Field of Search....... 307/252 B, 252 N, DIG. 4, 307/DIG. 5; 315/70, 71, 105, 194, 206, 276, 283; 323/22 SC

[56] References Cited
UNITED STATES PATENTS

| | | |
|---|---|---|
| 3,283,235 | 11/1966 | Auld et al................... 307/252 N X |
| 3,450,941 | 6/1969 | Butts............................ 323/22 SC X |
| 3,731,182 | 5/1973 | Hirono et al................ 307/252 B X |
| R26,119 | 12/1966 | Slater........................... 307/252 N X |

OTHER PUBLICATIONS

J. H. Galloway — "Using the Triac for Control of AC Power" — General Electric Application note 200.35, pp. 10, 11, 19, Mar. 1966.

Primary Examiner—R. V. Rolinec
Assistant Examiner—Lawrence J. Dahl
Attorney, Agent, or Firm—Cushman, Darby & Cushman

[57] ABSTRACT

An illuminating device for a microscope provided with a lighting control circuit controlled by changing the firing angle for which an impedance means is inserted between the output side of said lighting control circuit and primary side of the transformer in order to obtain a gentle rising curve for the current at the time of firing, thus to reduce the noise.

3 Claims, 4 Drawing Figures

ILLUMINATING DEVICE FOR A MICROSCOPE

This is a continuation of application Ser. No. 381,384, filed July 23, 1973, now abandoned.

BACKGROUND OF THE INVENTION

1. Field of the Invention

The present invention relates to an illuminating device for a microscope with a lighting control circuit and, more particularly, to said illuminating device with a lighting control circuit which controls the commercial current by changing the firing angle.

2. Description of the Prior Art

For many of lighting devices for microscopes, SCR, triac, etc., are used in the lighting control circuits. That is, the firing angle of the input pulse to the gate of the SCR or triac is changed in order to control the current from the commercial power source, the current taken out being thus controlled is supplied to the primary winding of a transformer and the light-source lamp of the illuminating device is lit by the output from the secondary winding of said transformer. Such illuminating device provided with the lighting control circuit containing the SCR or triac in which the firing angle is changed has a disadvantage that a whiltling noise offensive to the ear is caused continuously by vibration of the transformer and of the filament of the source lamp. Especially when observing an object by a microscope at a quiet place, this noise is heard very loud and, for a sensitive person, this noise disturbs the observing work by the microscope. This kind of noise is inherent to an illuminating device with a lighting control circuit which controls the firing angle and it is very difficult to eliminate it.

To reduce said noise, a soundproofing or vibration-proofing device is sometimes provided to the illuminating device. In those methods, however, it is impossible to prevent the noise satisfactorily and, moreover, the illuminating device becomes large and it becomes not suitable for using as the illuminating device for a microscope.

SUMMARY OF THE INVENTION

It is, therefore, the principal object of the present invention to provide an illuminating device for a microscope for which the noise is reduced by adding an impedance means between the lighting control circuit and transformer of the existing illuminating device.

Regarding said kind of illuminating device provided with the lighting control circuit which changes the current by changing the firing angle, the inventor found that most of the noise caused by said device is generated by sudden rising of the current with a steep curve at the time of firing of the lighting control circuit. In the present invention, the noise is reduced by arranging that the rising curve of the current at the time of firing becomes gentle, thus by eliminating the main cause of the noise based on the above discovery. For this purpose, in the illuminating device according to the present invention, an impedance means is inserted between the output side of the lighting control circuit and primary side of the transformer to obtain a gentle rising curve for said current at the time of firing.

DETAILED DESCRIPTION OF THE PREFERRED EMBODIMENT

Figure 1:
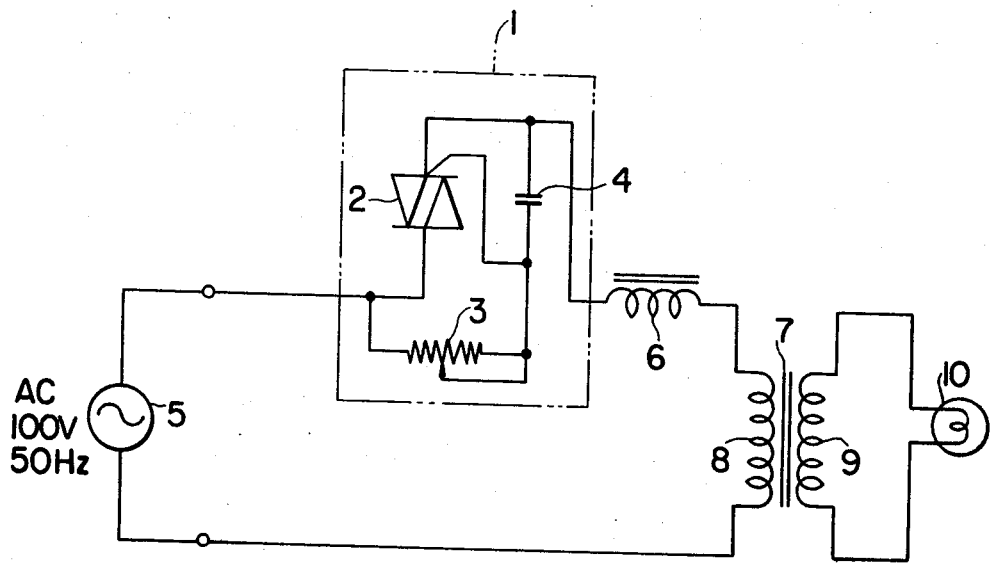
FIG. 1 shows a circuit diagram of an embodiment of the illuminating device for a microscope according to the present invention.

In FIG. 1 showing the circuit of an embodiment of the illuminating device for microscopes according to the present invention, numeral 1 designates a lighting control circuit. In the present embodiment, a triac 2 is used for said lighting control circuit 1. The control electrode of the triac 2 is connected to the common connecting point of a variable resistor 3 and a capacitor 4. The lighting control circuit 1 is connected to a commercial power source 5 and, on the output side of the lighting control circuit 11, a primary winding 8 of a transformer 7 is connected through the choke coil 6. Numeral 9 designates the secondary winding of the transformer 7 and numeral 10 designates a light-source lamp. In this illuminating device, the firing angle of the triac 2 is changed by adjusting the resistance of the variable resistor 3 in order to change the output current, thus the light intensity of the source lamp 10 is changed. The illuminating device according to the present invention has a simple structure arranged only by adding the choke coil 6 to the conventional illuminating device.

Figure 2A:
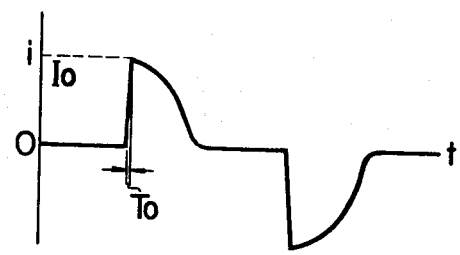
FIG. 2a shows the waveform of the current for the conventional illuminating devices.
Figure 2B:
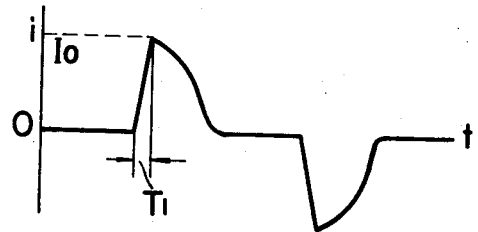
FIG. 2b shows the waveform of the current for the illuminating device according to the present invention.

FIG. 2a shows the waveform of the current which flows through the triac 2 of the conventional illuminating device in which the choke coil 6 is not connected. On the other hand, FIG. 2b shows the waveform of the current which flows through the triac 2 of the illuminating device according to the present invention as shown in FIG. 1. When calculation is made for the value $di/dt$, which shows the gradient of the rising curve of the current at the moment when the triac 2 is fired, for waveforms shown in these figures, it becomes $di/dt = Io/To = 0.8 \ A/0.01 \ ms = 80 \ A/ms$ for the conventional illuminating device shown in FIG. 2a, while it becomes $di/dt = Io/Ti = 0.8 \ A/0.3 \ ms = 2.6 \ A/ms$ for the illuminating device according to the present invention shown in FIG. 2b. That is, by inserting an impedance means as the capacitor 4, the choke coil 6 and the like, the gradient of the current rising curve when the triac 2 is fired becomes remarkably small and it becomes about 1/30 of that value for the conventional case where the choke coil 6 is not inserted. As it is evident from the above, the present invention provides an illuminating device for which noise generation is extremely minimized and the noise is made almost inaudible by eliminating the main cause of noise generation at the transformer 7 and source lamp 10, i.e., by changing the steep rising curve of the current, when the triac 2 is fired, to a gentle curve by the fact that the choke coil 6 is inserted.

In the embodiment shown in FIG. 1, the choke coil 6 of the inductance 0.1 is used. When a choke coil with still larger inductance is used, the rising curve of the current when the triac 2 is fired becomes still gentler and the noise becomes still smaller. In that case, however, size of the coil becomes larger.

As for the loss caused when the choke coil 6 is used as in the case of the illuminating device according to the present invention, the loss by the resistance of the choke coil 6 may have to be considered. However, the internal resistance of the choke coil 6 here is about 1Ω and, therefore, the loss of power is within 1 W and is negligibly small.

Figure 3:
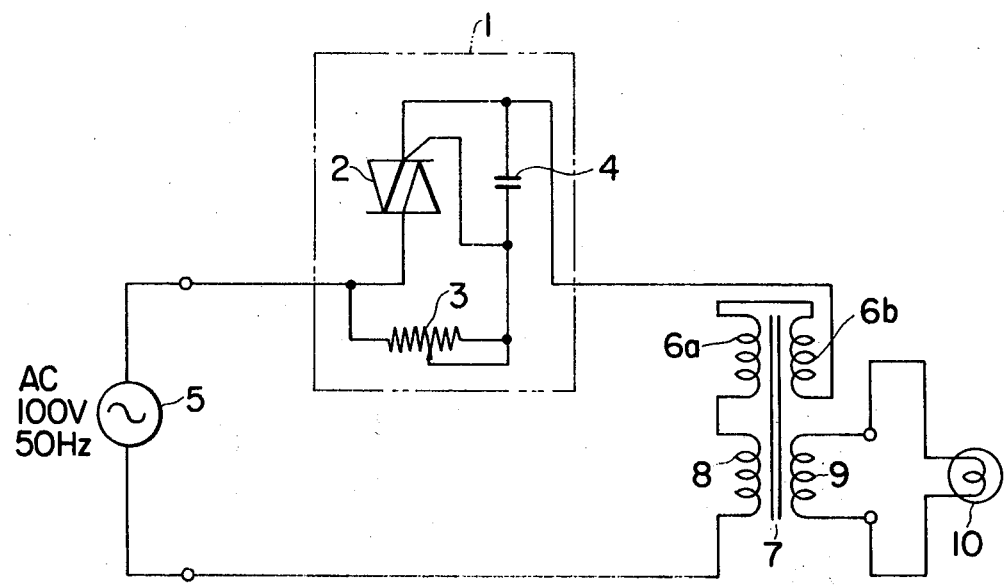
FIG. 3 shows a circuit diagram of an another embodiment of the illuminating device for a microscope according to the present invention.

It is evident that the present invention is not limited only to the embodiment shown in FIG. 1 but it is possible to make various alternative arrangements. For example, though a triac is employed in the above embodiment for the lighting control circuit, it is also possible to use a control rectifier such as SCR or the like. Besides, as for the choke coil, it is also possible to use a choke coil for a noise filter for which the inductance is large. It is further possible to remodel the primary winding of the transformer. That is, in another embodiment shown in FIG. 3, another windings 6a and 6b are connected in series to the primary winding 8 of the transformer 7 instead of the choke coil 6 in FIG. 1. The direction of spiral of the winding 6b is reversed to that of the winding 6a to offset electromotive forces generating in each winding. The windings 6a and 6b will be used as the impedance means same as the choke coil 6 in FIG. 1.

I claim:
1. In an illuminating arrangement for a microscope including a light and an AC power source, a lighting control circuit coupling the power source to the light, said lighting control circuit comprising a solid-state voltage-controlled switching device, said switching device including firing angle adjustment means for changing the firing angle of said switching device to adjust the amount of power supplied to the light, a transformer including a primary winding and a secondary winding, said secondary winding connected to the light, and an inductance means, said inductance means connected between said solid-state voltage-controlled switching device and said primary winding of said transformer and having an inductance value sufficient to prevent current from rising steeply when said switching device is fired to thereby substantially prevent generation of audio frequencies by the firing of said voltage-controlled switching device.

2. A lighting control circuit in accordance with claim 1 in which said inductance means is a choke coil.

3. A lighting control circuit in accordance with claim 1 in which said inductance means comprises an additional winding of said transformer, said additional winding connected in series with said primary winding of said transformer.

* * * * *